(12) United States Patent
van der Goot

(10) Patent No.: US 10,970,181 B2
(45) Date of Patent: *Apr. 6, 2021

(54) CREATING DISTRIBUTED STORAGE DURING PARTITIONS

(71) Applicant: EMC IP Holding Company LLC, Hopkinton, MA (US)

(72) Inventor: Roel van der Goot, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/377,384

(22) Filed: Apr. 8, 2019

(65) Prior Publication Data

US 2019/0235980 A1    Aug. 1, 2019

Related U.S. Application Data

(63) Continuation of application No. 15/241,474, filed on Aug. 19, 2016, now Pat. No. 10,282,263, which is a (Continued)

(51) Int. Cl.
*G06F 11/20* (2006.01)
*G06F 11/00* (2006.01)
(Continued)

(52) U.S. Cl.
CPC ........ *G06F 11/2094* (2013.01); *G06F 3/067* (2013.01); *G06F 3/0611* (2013.01); *G06F 3/0647* (2013.01); *G06F 11/00* (2013.01); *G06F 11/2089* (2013.01); *G06F 12/0813* (2013.01); *G06F 12/0815* (2013.01); *G06F 2201/805* (2013.01); *G06F 2201/82* (2013.01); *G06F 2212/154* (2013.01); *G06F 2212/60* (2013.01); *G06F 2212/621* (2013.01)

(58) Field of Classification Search
CPC .... G06F 11/2094; G06F 11/00; G06F 3/0611; G06F 3/0647; G06F 3/067; G06F 12/0813; G06F 12/0815; G06F 11/2089; G06F 2201/805; G06F 2201/82; G06F 2212/154; G06F 2212/60; G06F 2212/621; G06F 11/1471; G06F 11/1076
USPC .................................................... 714/6.22
See application file for complete search history.

(56) References Cited

U.S. PATENT DOCUMENTS

| 7,937,617 | B1 * | 5/2011 | Nagineni | G06F 11/2046 714/13 |
| 9,436,564 | B1 * | 9/2016 | van der Goot | G06F 3/0647 |
| 2006/0106747 | A1 * | 5/2006 | Bartfai | G06F 11/2082 |

* cited by examiner

*Primary Examiner* — Yair Leibovich
(74) *Attorney, Agent, or Firm* — Muirhead and Saturnelli, LLC

(57) ABSTRACT

A system and method are provided for processing to create distributed volume in a distributed storage system during a failure that has partitioned the distributed volume (e.g. an array failure, a site failure and/or an inter-site network failure). In an embodiment, the system described herein may provide for continuing distributed storage processing in response to I/O requests from a source by creating the local parts of the distributed storage during the failure, and, when the remote site or inter-site network return to availability, the remaining part of the distributed volume is automatically created. The system may include an automatic rebuild to make sure that all parts of the distributed volume are consistent again. The processing may be transparent to the source of the I/O requests.

20 Claims, 9 Drawing Sheets

Related U.S. Application Data continuation of application No. 14/230,545, filed on Mar. 31, 2014, now Pat. No. 9,436,564.

(51) Int. Cl.
    *G06F 3/06*     (2006.01)
    *G06F 12/0813*     (2016.01)
    *G06F 12/0815*     (2016.01)

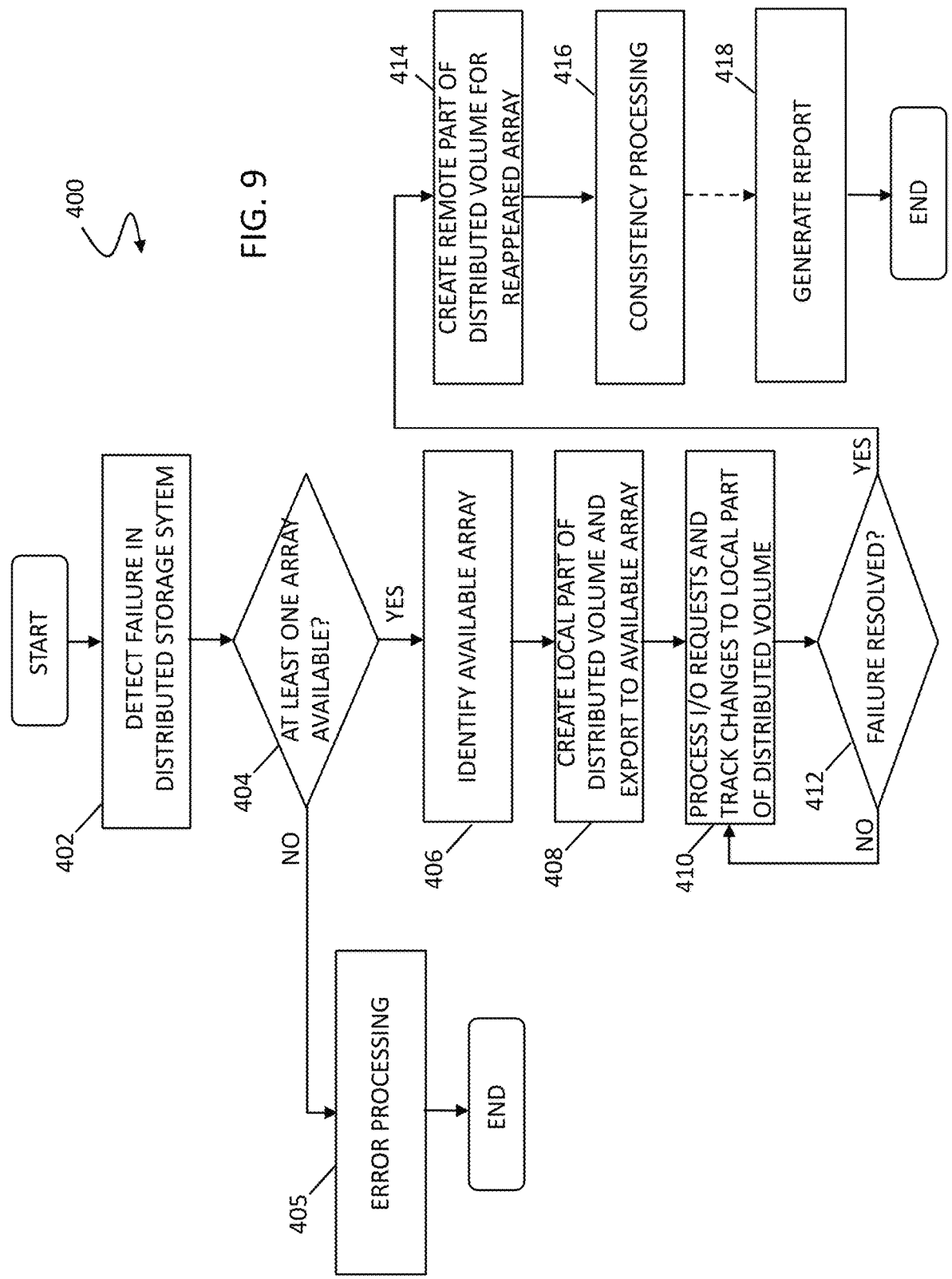

CREATING DISTRIBUTED STORAGE DURING PARTITIONS

TECHNICAL FIELD

This application is related to the field of data storage and, more particularly, to systems for managing data sharing among multiple sites over one or more networks.

BACKGROUND OF THE INVENTION

In current storage networks, and particularly storage networks including geographically remote directors (or nodes) and storage resources, preserving or reducing bandwidth between resources and directors while providing optimized data availability and access is highly desirable. Data access may be localized, in part, to improve access speed to pages requested by host devices. Caching pages at directors provides localization, however, it is desirable that the cached data be kept coherent with respect to modifications at other directors that may be caching the same data. An example of a system for providing distributed cache coherence is described in U.S. Pat. No. 7,975,018 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

Data transfer among storage devices, including transfers for data replication or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Particularly for asynchronous transfers, it is desirable to maintain a proper ordering of writes such that any errors or failures that occur during data transfer may be properly identified and addressed such that, for example, incomplete data writes be reversed or rolled back to a consistent data state as necessary. Reference is made, for example, to U.S. Pat. No. 7,475,207 to Bromling et al. entitled "Maintaining Write Order Fidelity on a Multi-Writer System," which is incorporated herein by reference, that discusses features for maintaining write order fidelity (WOF) in an active/active system in which a plurality of directors (i.e. controllers and/or access nodes) at geographically separate sites can concurrently read and/or write data in a distributed data system. Discussions of data ordering techniques for synchronous and asynchronous data replication processing for other types of systems, including types of remote data facility (RDF) systems produced by EMC Corporation of Hopkinton, Mass., may be found, for example, in U.S. Pat. No. 7,613,890 to Meiri, entitled "Consistent Replication Across Multiple Storage Devices," U.S. Pat. No. 7,054,883 to Meiri et al., entitled "Virtual Ordered Writes for Multiple Storage Devices," and U.S. Pat. No. 8,335,899 to Meiri et al., entitled "Active/Active Remote Synchronous Mirroring," which are all incorporated herein by reference and are assigned to the assignee of the present application.

Under known distributed storage volume processing, distributed storage volumes may not be automatically created during a site failure, an array failure and/or an inter-site network failure that has partitioned the distributed volume. When an administrator wants to create a distributed storage volume that spans two backend arrays where one of the backend arrays is missing (e.g. as a result of the site failure, an array failure and/or the inter-site network failure), the administrator has to change the workflow to (1) create a volume on the available array; (2) export the local volume for I/O processing; (3) wait for the other array to reappear or otherwise become again available; (3) create a volume on the reappeared array; and (4) upgrade the local volume to a the distributed one. This process relies on the administrator and may be error-prone.

Accordingly, it would be desirable to provide an effective and efficient system to address issues like that noted above for a distributed storage system.

SUMMARY OF THE INVENTION

According to the system described herein, a method is provided for maintaining distributed storage processing of a distributed volume, the method being performed by at least one processor. The method includes determining occurrence of a failure causing at least one array of a plurality of arrays of a distributed storage system to become unavailable, and identifying at least one available array of the plurality of arrays. A local part of the distributed volume is created and the distributed volume is indicated as being out of compliance with distributed storage requirements. The local part of the distributed volume is exported to the at least one available array. In response to at least one I/O request received at the distributed storage system for the distributed volume during the failure, the distributed storage processing is continued at the local part and changes to the local part of the distributed volume are tracked. The at least one unavailable array of the plurality of arrays is determined as being again available. After the at least one unavailable array is determined as being again available, a remote part of the distributed volume is created at the reappeared array. Consistency processing is performed to ensure that the distributed volume is in compliance with the distributed storage requirements. The distributed storage system may include a redundant array of independent disks (RAID) system. Performance of the method may be transparent to a source of the at least one I/O request. The consistency processing may include performing an automatic rebuild of the distributed volume to ensure the remote part of the distributed volume is made consistent with the local part. After creating the local part, a report may be generated indicating the distributed volume as being out of compliance with distributed storage requirements. After performing the consistency processing, a report may be generated indicating repair of the distributed storage processing. A designation of the distributed volume as being out of compliance with the distributed storage requirements that occurs after creation of the local part during the failure is the same as a designation of a particular distributed volume being out of compliance resulting from the failure occurring after creation of the particular distributed volume.

According further to the system described herein, a non-transitory computer-readable medium stores software for maintaining distributed storage processing of a distributed volume. The software includes executable code that determines occurrence of a failure causing at least one array of a plurality of arrays of a distributed storage system to become unavailable. Executable code is provided that identifies at least one available array of the plurality of arrays. Executable code is provided that creates a local part of the distributed volume and indicates the distributed volume as being out of compliance with distributed storage requirements. Executable code is provided that exports the local part of the distributed volume to the at least one available array. Executable code is provided that, in response to at least one I/O request received at the distributed storage system for the distributed volume during the failure, continues the distributed storage processing by tracking changes to the local part of the distributed volume. Executable code is provided that determines that the at least one unavailable array of the plurality of arrays is again available. Executable code is provided that, after the at least one unavailable array is determined as being again available, creates a remote part of the distributed volume at the reappeared array. Executable code is provided that performs consistency processing to ensure that the distributed volume is in compliance with the distributed storage requirements. The distributed storage system may include a redundant array of independent disks (RAID) system. Performance of the software may be transparent to a source of the at least one I/O request. The executable code that performs consistency processing may include executable code that performs an automatic rebuild of the distributed volume to ensure the remote part of the distributed volume is made consistent with the local part. Executable code may be provided that, after creating the local part, generates a report indicating the distributed volume as being out of compliance with distributed storage requirements. Executable code may be provided that, after performing the consistency processing, generates a report indicating the failure and the steps performed to maintain the distributed storage processing. A designation of the distributed volume as being out of compliance with the distributed storage requirements that occurs after creation of the local part during the failure may be the same as a designation of a particular distributed volume being out of compliance resulting from the failure occurring after creation of the particular distributed volume.

According further to the system described herein, a distributed storage processing system includes a plurality of arrays that store data, and at least one controller that manages storage of data on the plurality of arrays. A non-transitory computer-readable medium stores software, executable by the at least one controller, for maintaining distributed storage processing of a distributed volume during a failure in connection with a plurality of arrays of a distributed storage system. The software includes executable code that determines occurrence of a failure causing at least one array of a plurality of arrays of a distributed storage system to become unavailable. Executable code is provided that identifies at least one available array of the plurality of arrays. Executable code is provided that creates a local part of the distributed volume and indicates the distributed volume as being out of compliance with distributed storage requirements. Executable code is provided that exports the local part of the distributed volume to the at least one available array. Executable code is provided that, in response to at least one I/O request received at the distributed storage system for the distributed volume during the failure, continues the distributed storage processing by tracking changes to the local part of the distributed volume. Executable code is provided that determines that the at least one unavailable array of the plurality of arrays is again available. Executable code is provided that, after the at least one unavailable array is determined as being again available, creates a remote part of the distributed volume at the reappeared array. Executable code is provided that performs consistency processing to ensure that the distributed volume is in compliance with the distributed storage requirements. The distributed storage system may include a redundant array of independent disks (RAID) system. Performance of the software may be transparent to a source of the at least one I/O request. The executable code that performs consistency processing may include executable code that performs an automatic rebuild of the distributed volume to ensure the remote part of the distributed volume is made consistent with the local part. Executable code may be provided that, after creating the local part, generates a report indicating the distributed volume as being out of compliance with distributed storage requirements. Executable code may be provided that, after performing the consistency processing, generates a report indicating the failure and the steps performed to maintain the distributed storage processing. A designation of the distributed volume as being out of compliance with the distributed storage requirements that occurs after creation of the local part during the failure may be the same as a designation of a particular distributed volume being out of compliance resulting from the failure occurring after creation of the particular distributed volume.

BRIEF DESCRIPTION OF THE DRAWINGS

Embodiments of the system described herein are explained with reference to the several figures of the drawings, which are briefly described as follows.

FIG. 9 is a flow diagram showing processing of a distributed storage system in response to a failure according to an embodiment of the system described herein.

DETAILED DESCRIPTION OF VARIOUS EMBODIMENTS

Figure 1:
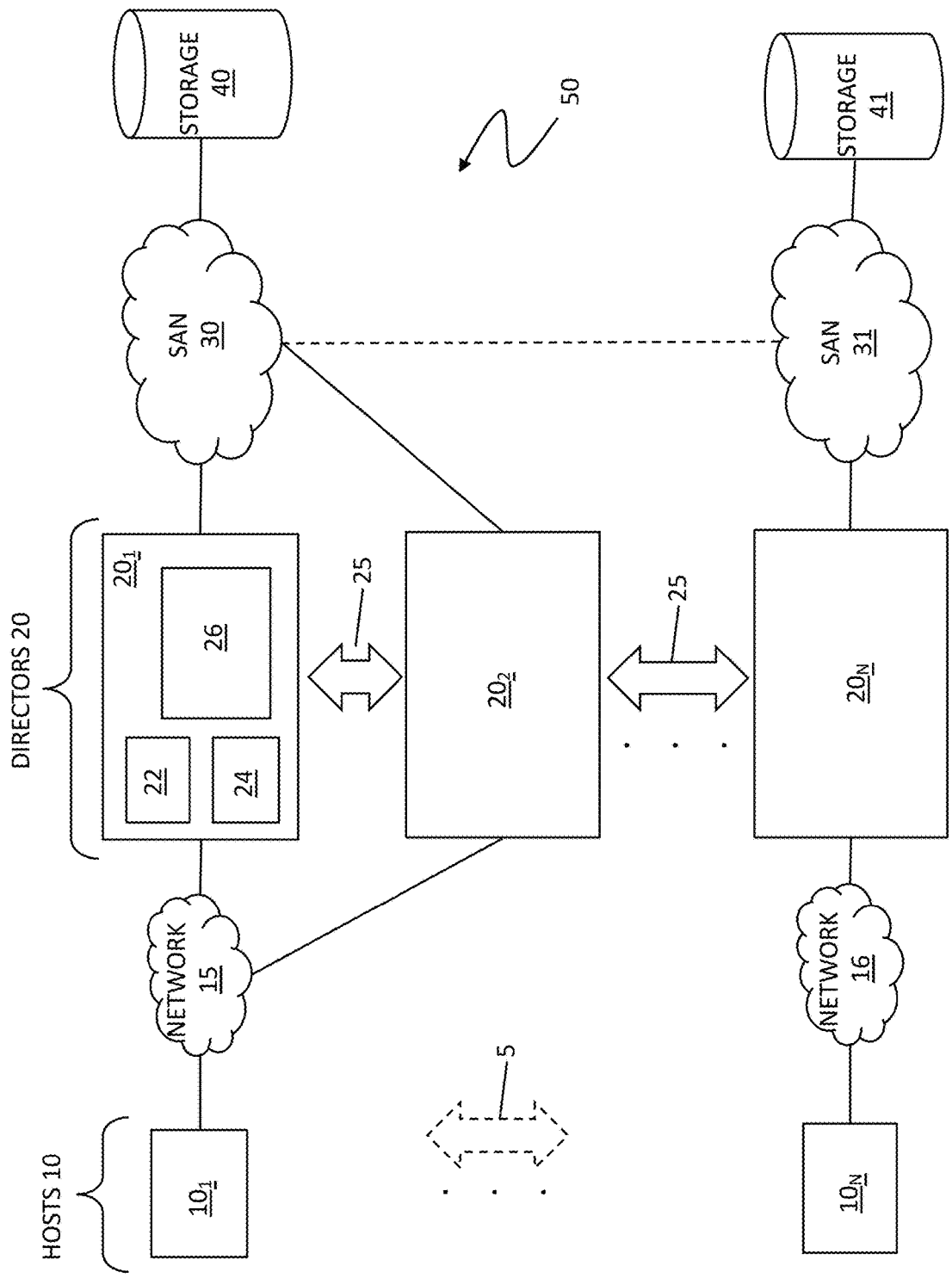
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 ($10_1$ to $10_N$) are communicably coupled with a plurality of directors 20 ($20_1$, $20_2$ to $20_N$). Each of the directors 20 may include a processor (CPU) component 22, such as a microprocessor or other intelligence module, a cache component 24 (e.g., RAM cache), an instance of a distributed cache manager 26 and/or other local storage and communication ports. (In general, "N" is used herein to indicate an indefinite plurality, so that the number "N" when referred to one component does not necessarily equal the number "N" of a different component. For example, the number of hosts 10 may or may not equal the number of directors 20 in FIG. 1.) Cache memory may be considered memory that is faster and more easily accessible by a processor than other non-cache memory used by a device.

Each of the hosts 10 may be communicably coupled to one or more of the directors 20 over one or more network connections 15, 16. It is noted that host devices 10 may be operatively coupled with the directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another. It is also noted that in various embodiments the networks 15, 16 may be combined with one or more SAN networks 30, 31.

Each of the directors 20 may also include, or be communicably coupled with, one or more file systems, such as a virtual machine file system (VMFS), a new technology file system (NTFS) and/or other appropriate file system, and may be communicably coupled with one or multiple storage resources 40, 41, each including one or more disk drives and/or other storage volumes, over the one or more storage area networks (SAN) 30, 31, and/or other appropriate network, such as a LAN, WAN, etc. The directors 20 may be located in close physical proximity to each other, and/or one or more may be remotely located, e.g., geographically remote, from other directors, as further discussed elsewhere herein. The SANs 30, 31 may represent a plurality of networks (including more than two SANs), but, in an embodiment, it is possible for the SANs 30, 31 to be coupled together, and/or for embodiments of the system described herein to operate on the same SAN, as representationally illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16. Several of the directors 20 may be clustered together at one or more sites and in which the sites are geographically distant from one another. The system described herein may be used in connection with a vSphere and/or VPLEX product produced by VMware Inc. of Palo Alto, Calif. and EMC Corporation of Hopkinton, Mass., respectively. The system described herein may also be used in connection with an RDF storage product produced by EMC Corporation, such as a Symmetrix product. Although discussed and illustrated in connection with embodiment for a distributed storage system, the system described herein may generally be used in connection with any appropriate distributed processing system.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31 that allows access to data stored on the storage networks. However, it may be appreciated that a director may also be embodied as an intelligent fabric switch, a hub adapter and/or other appropriate network device and may also be implemented as a virtual machine, as further discussed elsewhere herein. Because Locality Conscious Directory Migration (LCDM) is applicable to databases, any suitable networked director may be configured to operate as an access node with distributed cache manager functionality. For example, a distributed cache manager may be run on one or more desktop computers and/or virtual machines with a network connection.

According to the system described herein, a distributed storage system may enable a storage device to be exported from multiple distributed directors, which may be either appliances or arrays, for example. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more of the physical servers may be subdivided into a plurality of virtual machines. A virtual machine (VM) is a software implementation of a machine that executes programs like a physical machine. Virtualization software allows multiple VMs with separate operating systems to run in isolation on the same physical machine. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A virtual machine image is the image of the virtual machine as it resides in the host's memory. A virtual machine image may be obtained for an operating VM and transferred to another location where the VM continues execution from the state defined by the virtual machine image. In this way, the virtual machine image may be a snapshot of an execution state of a program by a VM that may be moved between different locations and processing thereafter continued without interruption.

In a virtualization environment, a virtual center, that may be referred to as a vCenter, may provide a central point of control for managing, monitoring, provisioning and migrating virtual machines. Virtual centers may operate to control virtual machines in data centers and in connection with cloud computing including using both internal and external cloud infrastructures and hybrids thereof.

Figure 2:
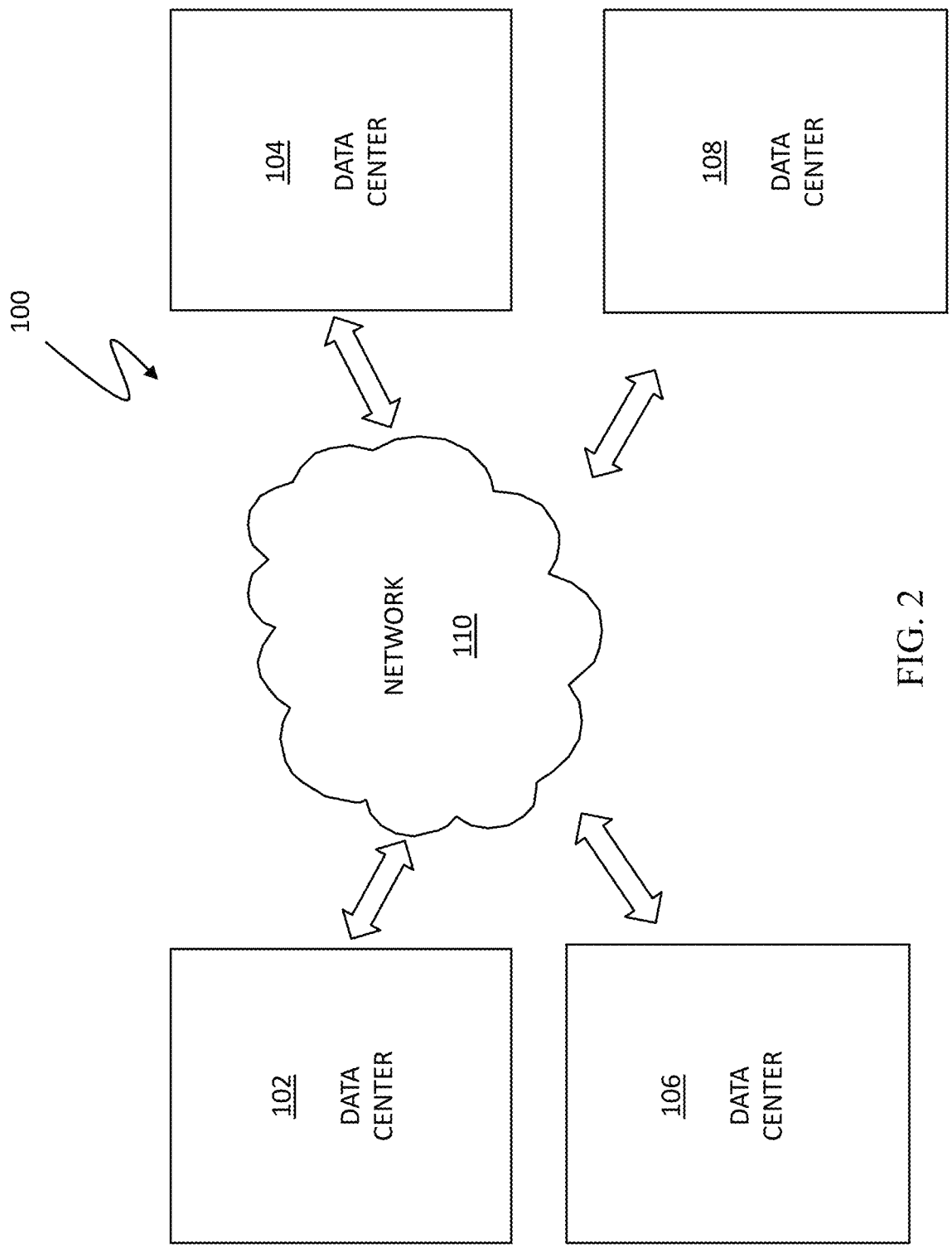
FIG. 2 is a schematic illustration showing a system that includes a plurality of data centers in communication via a network that may be used in accordance with an embodiment of the system described herein.

FIG. 2 is a schematic illustration showing a system 100 that includes a first data center 102 in communication with a second data center 104 via a network 110. Although the following embodiments are discussed principally in connection with data centers 102, 104 any number of additional data centers, represented as data centers 106, 108, may be also be used in connection with the system described herein. Each of the data centers 102, 104 may include a plurality of storage devices and processors as discussed elsewhere herein (not shown in FIG. 2) for executing applications using a plurality of VMs. The VMs may be configured using any appropriate server virtualization technology, such as that provided by VMware, Inc. of Palo Alto, Calif., including vSphere. VSphere is a suite of tools offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 102, 104 may contain any number of processors and storage devices that are configured to provide the functionality described herein. In an embodiment herein, the storage devices may be Symmetrix storage arrays provided by EMC Corporation of Hopkinton, Mass. Other appropriate types of storage devices and different types of processing devices may also be used in connection with the system described herein. The data centers 102, 104 may be configured similarly to each other or may be configured differently. The network 110 may be any network or similar mechanism allowing data communication between the data centers 102, 104. In an embodiment herein, the network 110 may be the Internet and/or any other appropriate network and each of the data centers 102, 104 may be coupled thereto using any appropriate mechanism. In other embodiments, the network 110 may represent a direct connection (e.g., a physical connection) between the data centers 102, 104.

In various embodiments, VMs may be migrated from a source one of the data centers 102, 104 to a destination one of the data centers 102, 104. VMs may be transferred from one data site to another, including VM mobility over geographical distances, for example, for reasons of disaster avoidance, load balancing and testing, among other reasons.

For a discussion of migrating VMs, reference is made, for example, to U.S. Pat. No. 8,667,490 to van der Goot, entitled "Active/Active Storage and Virtual Machine Mobility Over Asynchronous Distances," U.S. patent application Ser. No. 12/932,080 to Meiri et al., filed Feb. 17, 2011, entitled "VM Mobility Over Distance," and U.S. Pat. No. 8,682,852 to Salamon et al., entitled "Asymmetric Asynchronous Mirroring for High Availability," which are all incorporated herein by reference. A product, such as a VPLEX product of EMC Corporation, may be used to enable the resources of disparate storage systems in geographically dispersed data centers to be federated together and utilized as a single pool of virtual storage.

Figure 3:
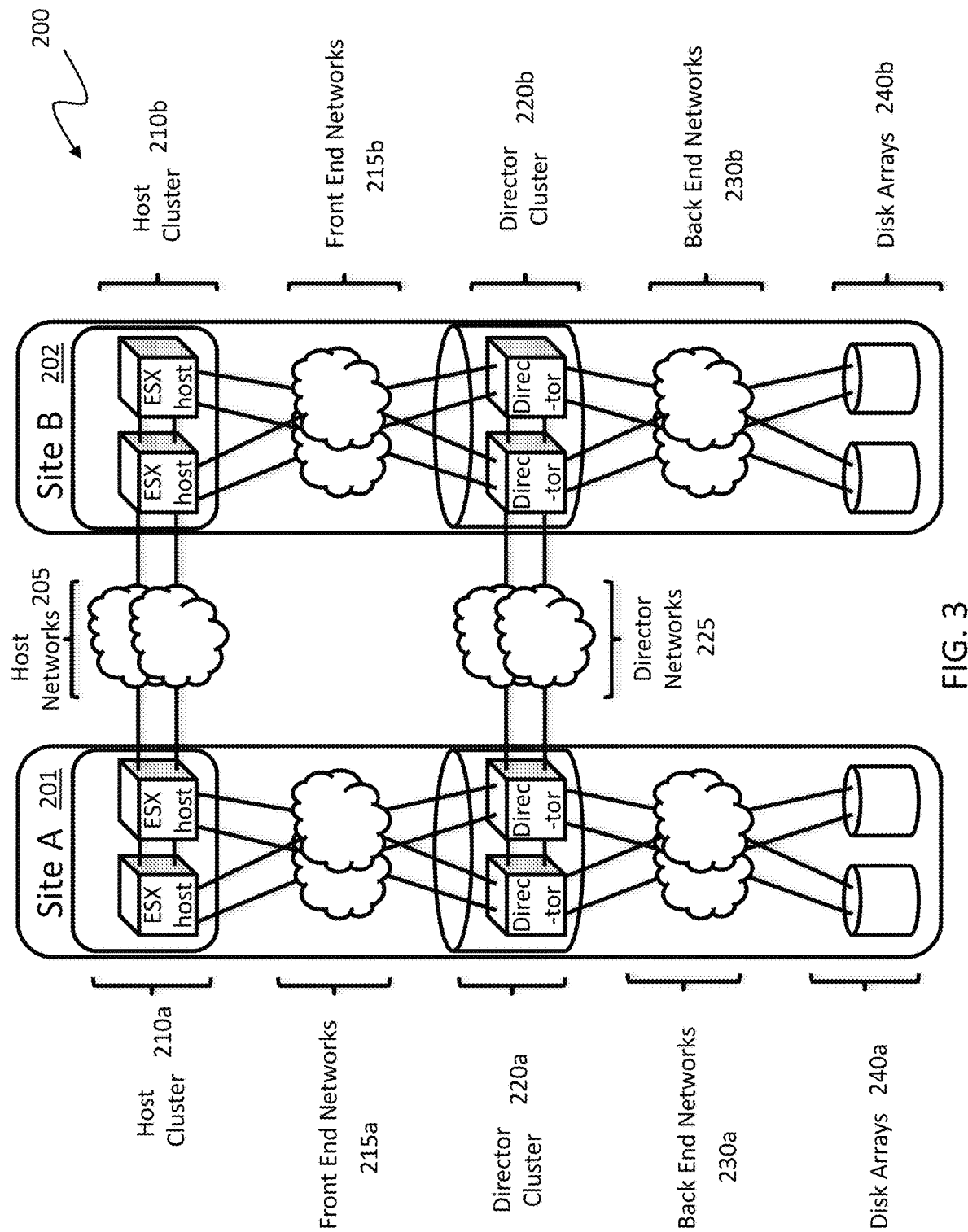
FIG. 3 is a schematic illustration showing a distributed storage system with multiple sites according to an embodiment of the system described herein.

FIG. 3 is a schematic illustration showing a distributed storage system 200 having multiple sites (and/or arrays) according to an embodiment of the system described herein. Although illustrated with two sites, Site A 201 and Site B 202, the system described herein may also operate in connection with additional sites. Although components are specifically identified with respect to Site A 201, Site B 202 (or any additional site) may also include the components discussed herein. The sites 201, 202 may include one or more hosts grouped in host clusters 210a,b, one or more directors grouped in director clusters 220a,b, and disk arrays 240a,b. Each host cluster 210a,b and director cluster 220a,b may each include software and/or other controllers or interfaces to control or administer operations in connection with described functions of the hosts and directors. In an embodiment, each host cluster 210a,b may include ESX hosts in a vSphere cluster and director cluster 220a,b may include directors in a VPLEX cluster. Front end networks 215a,b may connect through host links to the host clusters 210a,b and through front end links to the director clusters 220a,b. One or more back end networks 230a,b may connect through back end links to the director clusters 220a,b and through array links to the disk arrays 240a,b. In an embodiment, the front and back end networks may be Fibre Channel networks. The front end networks 215a,b allow the hosts (or VMs running therein) to perform input/output (I/O) operations with the host clusters 210a,b, while the back end networks 230a,b allow the directors of the director clusters 220a,b to perform I/O on the disk arrays 240a,b. One or more host networks 205, such as vSphere Ethernet networks, connect the ESX hosts in host clusters 210a,b. One or more director networks 225 connect the directors of the director clusters 220a,b.

Various types of failures, including network failures, may result in behaviors that are further discussed elsewhere herein. It should be noted that the host cluster 210a,b (e.g., vSphere cluster) may be connected in such a way that VMs can keep their network (e.g., IP, FC, IB) addresses when migrating between clusters (for example, by means of a vLan or an open vSwitch). In various embodiments, the system described herein may be used in connection with one or more EMC Corporation products, such as VPLEX Metro and/or VPLEX Geo, that may be used and configured to expose one or more distributed volumes from multiple director clusters. A VMFS may be created on top of these distributed volumes allowing VMs that migrate between the sites to see the same data (e.g., file and/or object) in either site. It is also noted that, as illustrated and according to various embodiments, each site 201, 202 may include redundancies in hosts, directors and links therebetween. It should be noted that the active/active system described herein may also be used in active/passive functioning as appropriate or desired.

I/O access may be provided to distributed volumes in an active/active system with two (or more) sites separated by an asynchronous distance. For asynchronous operation, a write operation to the director cluster at a remote site may be acknowledged as soon as a protection copy is made within the cluster. Sometime later the write data is synchronized to the remote site. Similarly, writes to the remote site are later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the inter-cluster link on an as needed basis. In the background, the controller (VPLEX) may synchronize the oldest dirty data between the clusters.

The above operations may work as long as the inter-cluster network is available. If the inter-cluster link fails, both clusters may contain dirty data that is unknown by the respective remote clusters. As a consequence of this failure, the director cluster may rollback the image of the data to a write order consistent point. In other words, the director cluster may rollback the image of the data to a point where it knows the data that is available on both clusters, or to a time where the write data was exchanged between both sites. The director cluster may also guarantee rollback to an image of the disk or volume that is write order consistent, which means that if the data of a specific write is available on the volume, all data of writes that were acknowledged before ("preceded") that write should be present too. Write order consistency is a feature that allows databases and/or other applications to recover by inspecting the volume image. As noted elsewhere herein, known techniques may provide write order consistency by bucketing writes in what are called deltas and providing the consistency on a delta boundary basis (see, e.g. U.S. Pat. No. 7,475,207 to Bromling et al.).

Suspend/resume migration processing may involve suspending a VM in the source site and resuming that VM in the destination site. Before the suspended VM is resumed, all dirty data for the affected VMFS may be synchronized from the source director cluster to the destination director cluster, and the preference (i.e. "winner" site) for the distributed volume may be changed from the source cluster to the destination cluster. The preference attribute may be related to a consistency group that contains one or more VMs. Hence, the VM may be in a consistency group of its own or all VMs in a consistency group may be migrated together. To know when the synchronization of a dirty cache is finished, the customer may map the VMFS to a distributed volume.

Failures may also occur when a VM is migrated while performing I/O operations. In an example, the migration of a VM during I/O operations may be facilitated by a VMware product called vMotion. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays. For further detailed discussions of specific system behaviors in connection with different types of failure scenarios, and in connection with the use of various products such as vSphere and VPLEX products, as discussed herein, reference is made, for example, to U.S. Pat. No. 8,667,490 to van der Goot, entitled "Active/Active Storage and Virtual Machine Mobility Over Asynchronous Distances," and U.S. patent application Ser. No. 13/433,885 to Salamon et al., filed Mar. 29, 2012, entitled "Asymmetric Asynchronous Mirroring for High Availability," which are incorporated herein by reference.

It is further noted that in connection with characterizing failure scenarios and identifying an appropriate site as a winner site for continuing operations, a witness node may be used according to an embodiment of the system described herein. It is noted that conditions and/or user preferences may cause a site to be indicated as a preferred site; however, in the event of certain failures, a winner site may be other than the preferred site and may cause re-selection of a preferred site. Reference is made, for example, to U.S. Pat. No. 8,578,204 to Ortenberg et al., entitled "Witness Facility for Distributed Storage System," which is incorporated herein by reference, that providing examples of features and uses of a witness node in a distributed storage system in connection with determining failure conditions.

Figure 4:
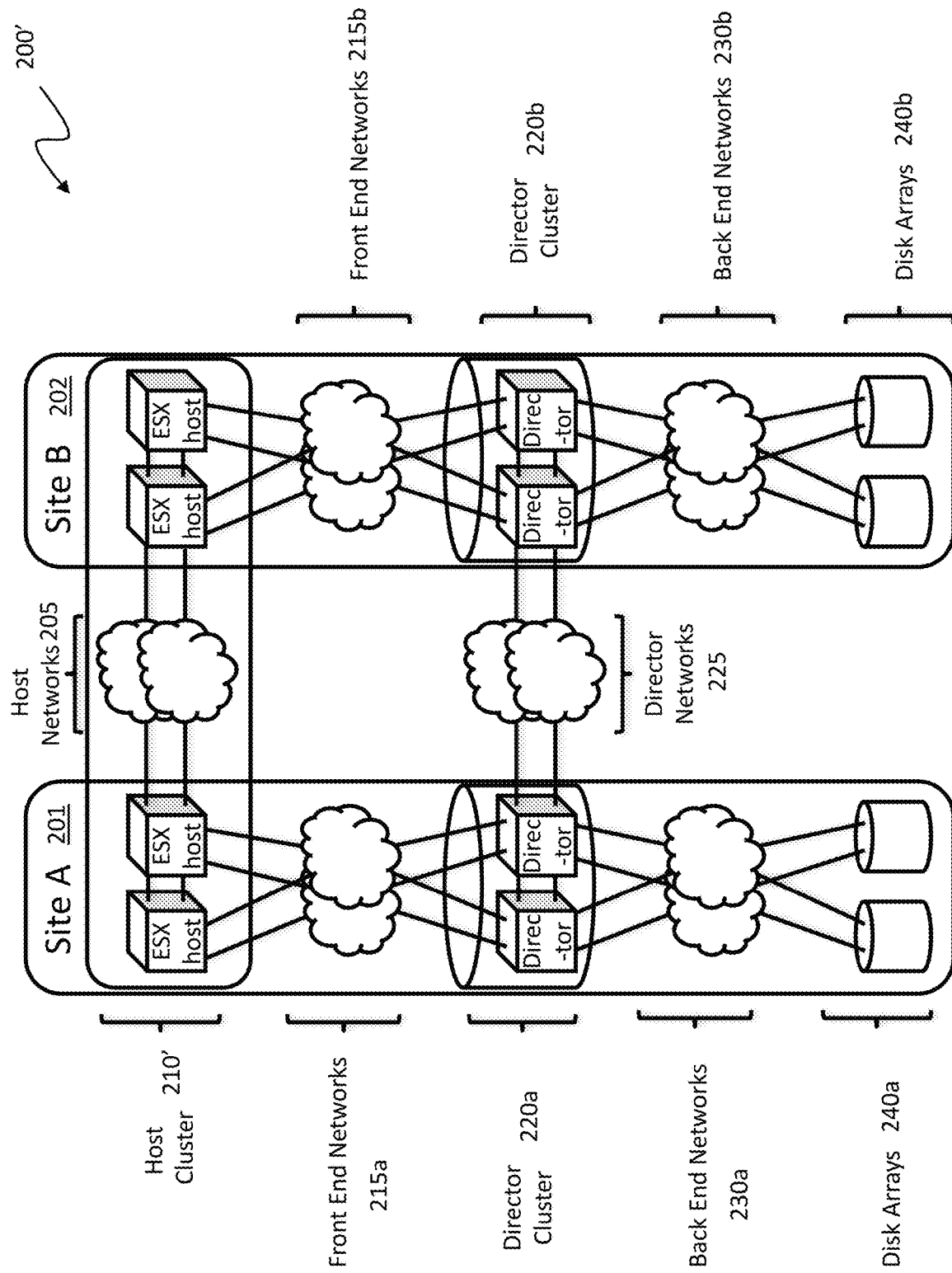
FIGS. 4 and 5 show alternative configurations of distributed storage systems that may be used in accordance with embodiments of the system described herein.
Figure 5:
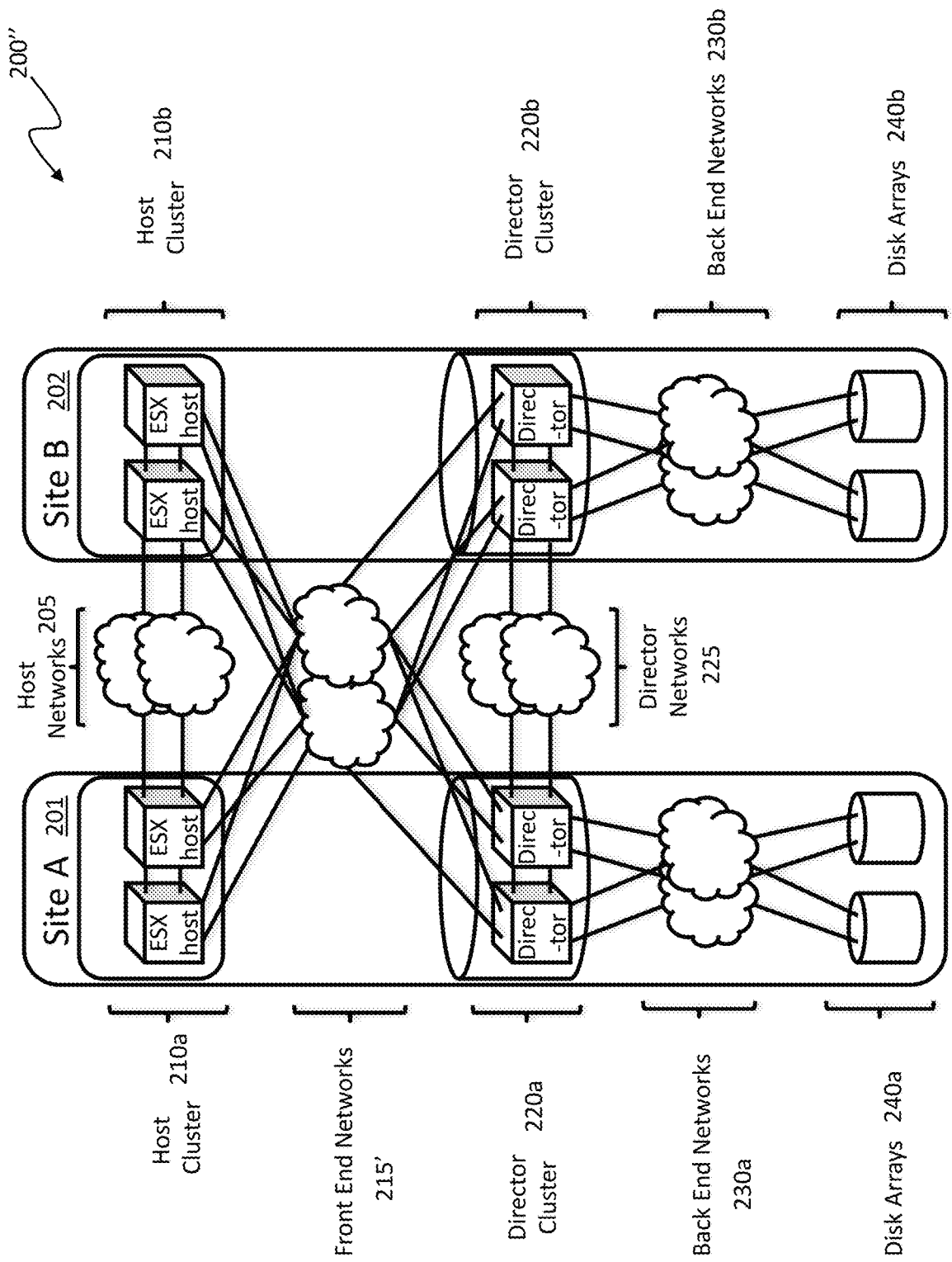

FIGS. 4 and 5 show alternative configurations for distributed storage systems that may be used in accordance with embodiments of the system described herein. In FIG. 4, a distributed storage system 200' is shown that includes a host cluster 210' as a distributed processing layer operating across the multiple sites 201, 202 and otherwise having elements like that discussed elsewhere herein. In FIG. 5, a distributed storage system 200" is shown in which the front end networks 215' are shown operating as an external network accessed by each of the sites 201, 202 and otherwise having elements like that discussed elsewhere herein.

A distributed storage system may include use of redundant disks to replicate the data into two or more copies. One such system is called redundant array of independent disks (RAID) and different levels of RAID protection may be provided according to various system features and configurations. For example, a RAID 1 system is where an exact copy or mirror of a set of data is stored on two disks to provide improved read performance or reliability. Higher RAID levels may include use of a RAID controller to add parity data to original data before storing it across the storage array. The parity data is calculated from the original data such that the failure of one or more disks may not result in the loss of the original data. For example, RAID 5 uses three disks to protect data from the failure of a single disk. In an embodiment, the system described herein may be principally used in connection with a distributed RAID 1 system, but may be used with any appropriate level or type of RAID system and/or other distributed storage system.

According to the system described herein, processing is disclosed for creating a distributed volume in a distributed storage system during a failure that has partitioned the distributed volume (e.g. a site failure, an array failure and/or an inter-site network failure). This processing produces a result that may be similar to that for the creation of a distributed volume followed by a similar failure. In an embodiment, the system described herein may provide for continuing distributed storage processing in response to I/O requests from a source by creating the local parts of the distributed storage during the failure, and, when the remote site or inter-site network return to availability, the remaining part of the distributed volume is automatically created. The system may include an automatic full or partial rebuild to make sure that both legs of the distributed volume are consistent again. In particular, it is noted that a partial rebuilt may be performed if the initial state of the volume/file/object is known, for example, all zeroes. The processing may be transparent to the source of the I/O requests.

Specifically, the system described herein provides that during a failure, a distributed storage system, e.g., distributed RAID-1 system, may still be created. The local part of the distributed volume may be created at the available local site but is automatically identified as being out of compliance in the distributed storage system since one of the legs (the remote site) of the distributed storage system is missing and/or unavailable. Once the remote site again becomes available, the system will automatically create the remote part of the distributed volume and bring the distributed storage system into compliance (e.g. RAID-1 compliant) to ensure consistency of the distributed volume on the distributed storage system. The system advantageously provides for more automation with less manual involvement by an administrator, thereby being less error prone and decreasing the probability of the administrator provisioning storage that is not asked for or required.

Figure 6:
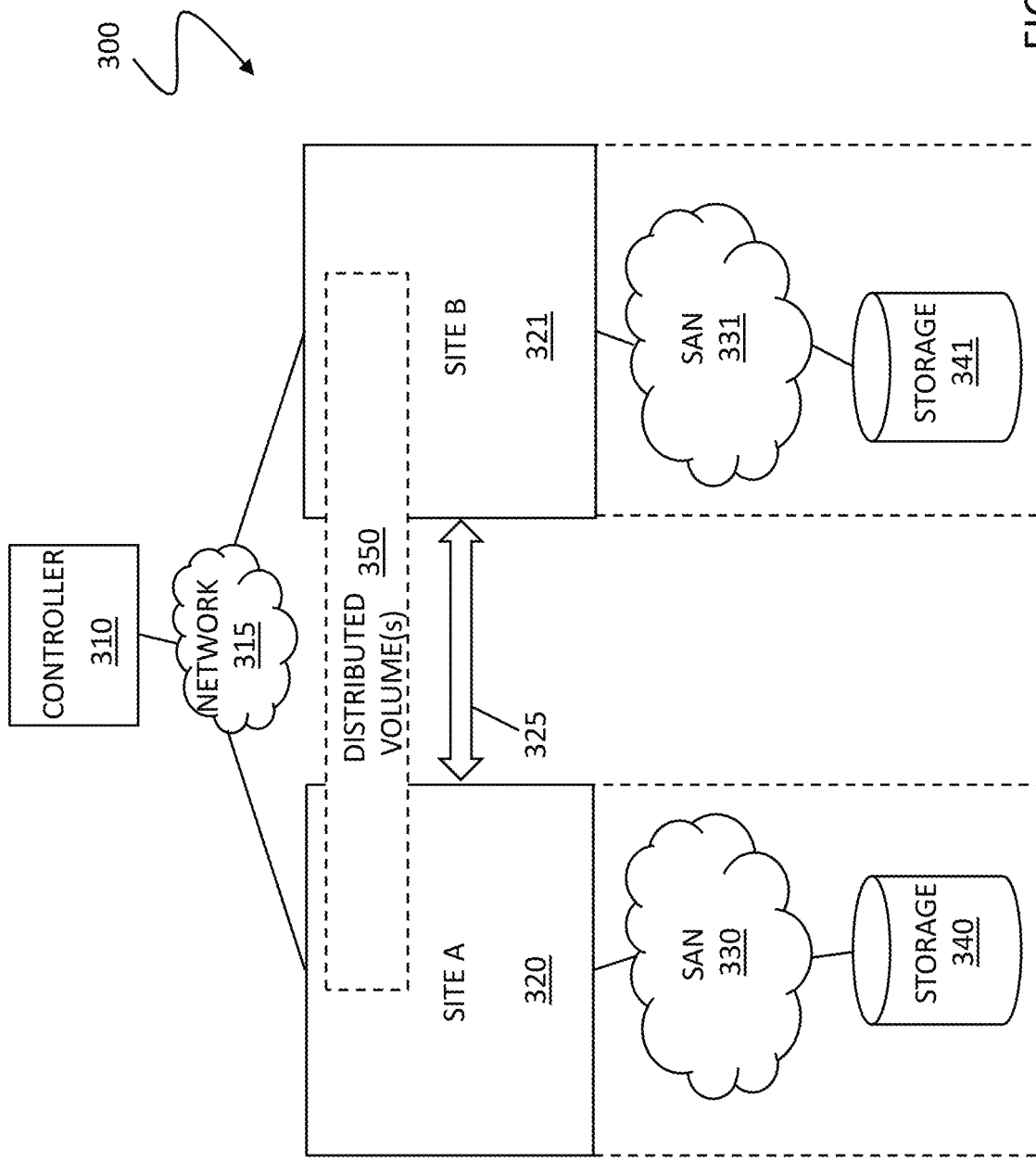
FIG. 6 is a schematic illustration of a distributed storage system with automated distributed volume creation capability in the event of a failure according to an embodiment of the system described herein.

FIG. 6 is a schematic illustration of a distributed storage system 300 with automated distributed volume creation capability in the event of a failure according to an embodiment of the system described herein. The system may include a plurality of sites, such as site A 320 and site B 321, for a distributed storage system like that discussed elsewhere herein. The plurality of storage sites form a collection of sites of the distributed storage system, and Although two sites are shown, more than two sites may be appropriately used and operated in connection with the system described herein. Specifically, for example, a distributed volume as discussed herein may span more than two sites and/or may be exported at more than 2 sites in connection with the system described herein. As further discussed elsewhere herein, the sites 320, 321 may be located geographically distant from each other. In various embodiment, the distributed storage system 300 may operate in an active/active mode in which multiple sites may provide mirroring for at least some of the data and may each handle processing of host read/write I/O requests and/or may operate in an active/passive mirroring mode having a primary site and a secondary (mirror) site. The sites 320, 321 may be connected via an interconnection 325, such as an IP network, a PCI bus, a FC network and/or any other appropriate type of network. A controller 310, such as implemented on a host and/or director, is shown and may communicate with the sites 320, 321 via a network 315.

A representative example of a distributed volume 350 (e.g. one or more distributed volume(s)) is shown schematically in connection with the sites 320, 321 and may be representative of a storage volume distributed across the sites 320, 321 in connection with distributed storage processing, as further discussed elsewhere herein. The multiple sites 320, 321 may together be engaged in distributed storage operations in connection with I/O requests of one or more hosts and maintaining a consistent global data cache. The operations may include facilitating data mirroring, including possibly allowing write access to multiple sites in an active/active configuration, as well as managing access to the mirrored data. In another embodiment, the distributed storage operations may include one or more distributed cache coherence protocols which guarantee data consistency for the distributed storage system 300. The sites 320, 321 may be coupled via SANs 330, 331 to storage resources 340, 341. The storage resources 340, 341 may be located in proximity to the sites 320, 321 and/or may be remotely located and accessed.

Figure 7:
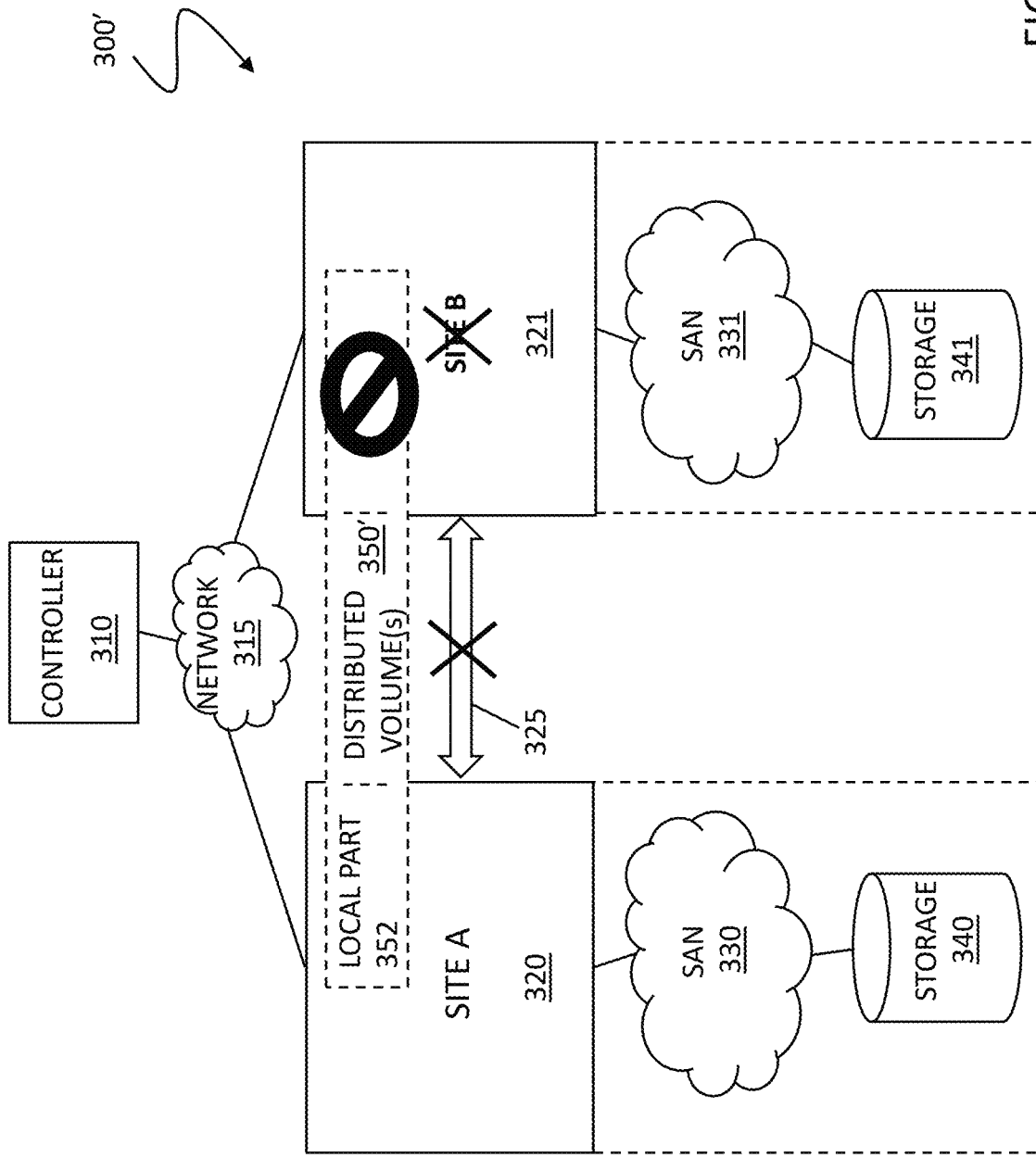
FIG. 7 is a schematic illustration of the distributed storage system showing a failure in the distributed storage system that has partitioned the distributed volume according to an embodiment of the system described herein.

FIG. 7 is a schematic illustration of a distributed storage system 300' according to an embodiment of the system described herein that is like the distributed storage system 300 but further showing a failure in the distributed storage system 300', such as a failure of the communication link 325 between the site A 320 and the site B 321 and/or a failure of one of the sites (Site B). In connection with the system described herein, an available (or "winner") site may continue to actively process I/O requests while the servicing of I/O requests at other sites is suspended and/or otherwise determined as being unavailable. In the illustration, site A is shown as being the available site. For example, if the sites 320, 321 contain mirrored data, then, following a failure, a mechanism, such as a witness node, may determine which of the sites 320, 321 continues to receive I/O requests and/is otherwise available, and which of the sites 320, 321 is not available. The witness node may be incorporated in and/or otherwise coupled to the controller 310 to provide the controller with information concerning available and unavailable sites.

According to an embodiment of the system described herein, during the failure, processing to create a distributed volume in a distributed storage system produces a results that may be similar to processing for the creation of a distributed volume followed by a failure. Namely, distributed storage processing may continue regardless of the failure, in processing that may be transparent to the user and even though the distribution to a remote site of one or more corresponding parts of a distributed volume is delayed pending resolution of the failure. In an embodiment, the system described herein provides for creating the local parts of the distributed storage during the failure, and, when the remote array, the remote site or inter-site network return to availability, the remaining part of the distributed volume is then automatically created and the components of the distributed storage system brought into compliance. In particular, the system may include an automatic partial or full rebuild to make sure that both legs of the distributed volume are consistent again. The system may include an automatic full or partial rebuild to make sure that both legs of the distributed volume are consistent again. In particular, it is noted that a partial rebuilt may be performed if the initial state of the volume/file/object is known, for example, all zeroes. The partially created distributed volume according to the system described herein may be made accessible for I/O.

Specifically, the system described herein provides that during a failure, a distributed storage system, e.g., distributed RAID-1 system, may still be created. As shown in the illustrated figure, during the failure, and in connection with continued distributed storage processing, a local part 352 of the distributed volume 350' may be created at the available local site (site A 320) in processing that may be controlled by the controller 310. The distributed volume 350' may automatically be identified as being out of compliance in the distributed storage system since one of the legs (the remote site B 321) of the distributed storage system 300' is missing and/or unavailable. Once the remote site (site B 321) reappears and again becomes available, the system 300' will automatically create the remote part of the distributed volume 350' and bring the distributed storage system 300' into compliance (e.g. RAID-1 compliant) to ensure consistency of the distributed volume on the distributed storage system 300' (see FIG. 8). The system advantageously provides for more automation with less manual involvement by an administrator, thereby being less error prone and decreasing the probability of the administrator provisioning storage that is not asked for or required.

Figure 8:
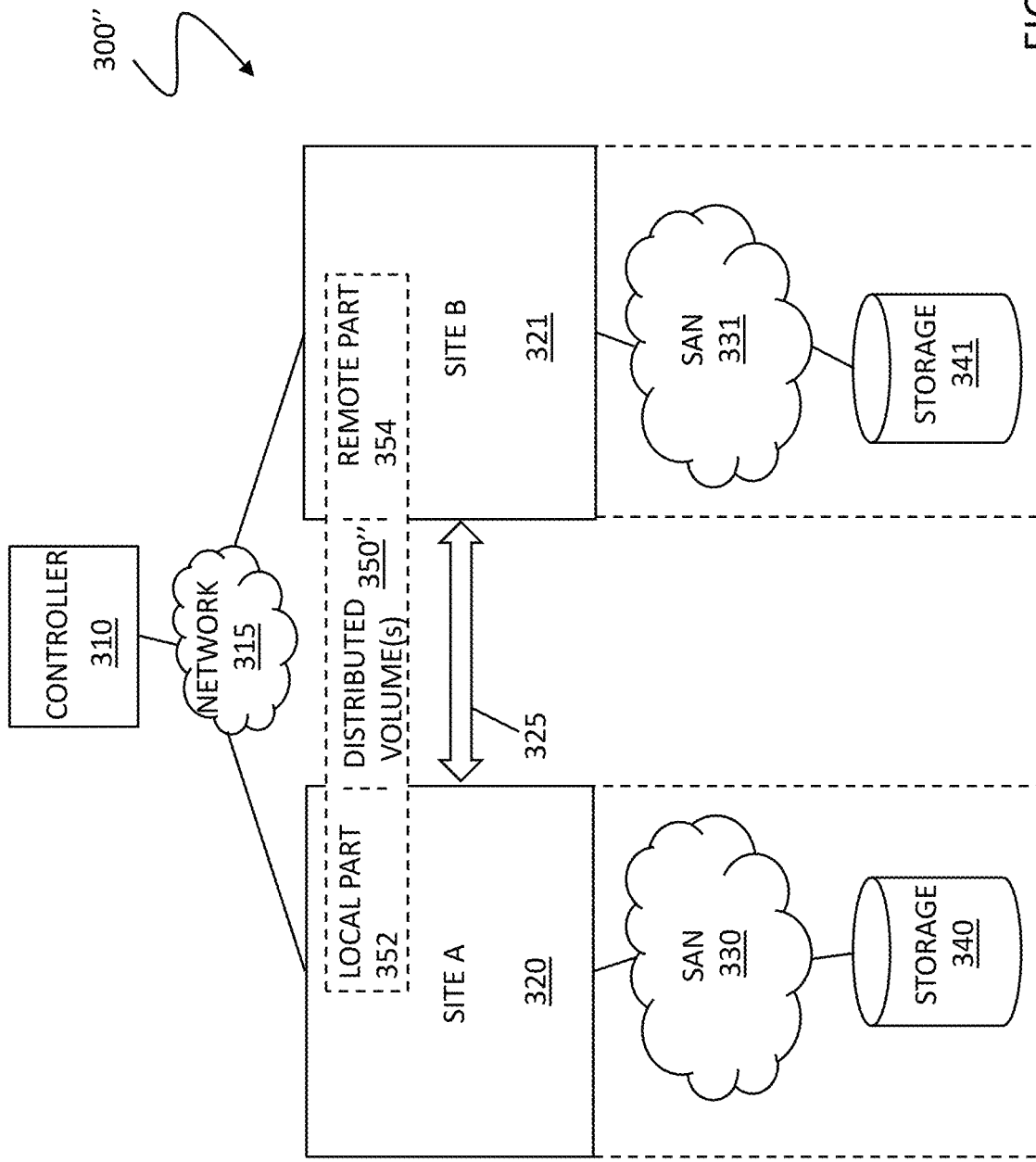
FIG. 8 is a schematic illustration of the distributed storage system according to an embodiment of the system described herein that is like the distributed storage system but after resolving the failure.

FIG. 8 is a schematic illustration of a distributed storage system 300" according to an embodiment of the system described herein, that is like the distributed storage system 300 but shown after resolving the failure discussed in connection with the distributed storage system 300'. After the remote site (site B) again becomes available, the system 300' will automatically create the remote part 354 of the distributed volume 350" and bring the distributed storage system 300" into compliance (e.g. RAID-1 compliant) to ensure consistency of the distributed volume 350" on the distributed storage system 300". The system advantageously provides for more automation with less manual involvement by an administrator, thereby being less error prone and decreasing the probability of the administrator provisioning storage that is not asked for or required. The processing may be transparent to the customer; that is, the customer may not necessarily be made aware that the distributed storage system 300" was not in compliance. The system may include report components that may generate a report of the failure and corresponding actions to maintain the distributed storage processing.

FIG. 9 is a flow diagram 400 showing processing of a distributed storage system in response to a failure according to an embodiment of the system described herein. The distributed storage system may have features like those discussed with respect to the distributed storage system 300 and including multiple sites and/or arrays. At a step 402, a failure in the distributed storage system is detected in which at least one array of the distributed storage system is not available. As further discussed elsewhere herein, various types of failures may include failure of an array, failure of one or more of the sites of the system, and/or failure of a communication link between the sites, and may include use of a witness node and/or other appropriate mechanism that may facilitate the determining of failures in a network and/or the availability or unavailability of sites or arrays in the network. After the step 402, at a test step 404 it is determined whether at least one array at a site of the distributed storage system, that may include two or more sites, is available. If not, then processing proceeds to a step 405 where error or other type of processing is performed reflecting that no site or array of the distributed storage system is available. After step 405, processing is complete this iteration of the processing.

If, at the test step 404, it is determined that at least one array of the distributed storage system is available, processing proceeds to a step 406 where an available array is identified as an array at which distributed storage processing may be continued but which will not be in compliance with distributed storage processing requirements (e.g. RAID-1 non-compliance in which at least one leg of the RAID-1 is not available for the distributed storage processing). In an embodiment, the identification of non-compliance may be indicated in a report; however, in other embodiments, in some cases the steps and actions concerning non-compliance may occur transparently to the user or source of the I/O requests according to the system described herein. In various embodiments, the array identified as available may be automatically determined, such as by one or more components of a controller, and/or, in some cases, may be determined using input of a user. After the step 406, at a step 408, a local part of the distributed volume is created and exported to the available array during the failure. As discussed, since only the local part of the distributed volume has been created and exported, the distributed storage is not fully operational, e.g., it not compliant with the requirements for a distributed volume of the distributed storage system.

After the step 408, at a step 410, the system processes I/O requests using the created local part of the distributed volume at the available array. In connection with the step 410, a bitmap may be created that keeps track of all the changes to the local part of the distributed volume, so only those parts have to copied in later consistency processing (e.g., see step 416). This step may be beneficially used, in particular, when a distributed volume starts from a known configuration (for example, all zeroes). It is further noted that the bitmap may need to be cleaned up and/or otherwise modified after later copying (e.g., see step 416). In this regard, a reporting step (like that discussed for step 418) may be created after step 410.

After the step 410 is a test step 412 where the system determines whether the failure has been resolved. If not, then processing proceeds back to the I/O processing and tracking of step 410. If the failure has been resolved, then processing proceeds to step 414, where the system automatically creates the remote part of the distributed volume for the reappeared array. After the step 414, at a step 416, the system performs consistency processing to automatically bring the distributed volume into compliance to ensure that the remote part of the distributed volume is made consistent with the local part. After the step 418, an optional step may be performed for generating a report that indicates repair of the distributed storage processing and reports on in-compliance condition for the distributed volume, although it is possible that the steps and actions may have occurred transparently to the user or source of the I/O requests according to the system described herein. After the step 418 (and/or step 416), processing is complete for this iteration being described in connection with the flow diagram 400.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of maintaining distributed storage processing of a distributed volume, the method being performed by at least one processor and comprising:
    determining occurrence of a failure causing at least one array of a plurality of arrays of a distributed storage system to become unavailable;
    identifying at least one available array of the plurality of arrays;
    creating a local part of the distributed volume using data from at least one of the plurality of arrays containing a replica of data on the array that has become unavailable and indicating the distributed volume as being out of compliance with distributed storage requirements;
    exporting the local part of the distributed volume to the at least one available array;
    in response to at least one I/O request received at the distributed storage system for the distributed volume during the failure, continuing the distributed storage processing at the local part of the distributed volume and tracking changes to the local part of the distributed volume;
    determining that the at least one unavailable array of the plurality of arrays is again available;
    after the at least one unavailable array is determined as being again available, creating a remote part of the distributed volume at the again available array; and
    ensuring that the distributed volume is in compliance with the distributed storage requirements.

2. The method according to claim 1, wherein the distributed storage system includes a redundant array of independent disks (RAID) system.

3. The method according to claim 1, wherein performance of the method is transparent to a source of the at least one I/O request.

4. The method according to claim 1, wherein ensuring that the distributed volume is in compliance includes performing an automatic rebuild of the distributed volume to ensure the remote part of the distributed volume is made consistent with the local part.

5. The method according to claim 1, further comprising:
    after creating the local part, generating a report indicating the distributed volume as being out of compliance with distributed storage requirements.

6. The method according to claim 1, further comprising:
    after ensuring that the distributed volume is in compliance, generating a report indicating repair of the distributed storage processing.

7. The method according to claim 1, wherein a designation of the distributed volume as being out of compliance with the distributed storage requirements that occurs after creation of the local part during the failure is same as a designation of a particular distributed volume being out of compliance resulting from the failure occurring after creation of the particular distributed volume.

8. A non-transitory computer-readable medium storing software for maintaining distributed storage processing of a distributed volume, the software comprising:
    executable code that determines occurrence of a failure causing at least one array of a plurality of arrays of a distributed storage system to become unavailable;
    executable code that identifies at least one available array of the plurality of arrays;
    executable code that creates a local part of the distributed volume using data from at least one of the plurality of arrays containing a replica of data on the array that has become unavailable and indicates the distributed volume as being out of compliance with distributed storage requirements;
    executable code that exports the local part of the distributed volume to the at least one available array;
    executable code that, in response to at least one I/O request received at the distributed storage system for the distributed volume during the failure, continues the distributed storage processing at the local part of the distributed volume and tracking changes to the local part of the distributed volume;
    executable code that determines that the at least one unavailable array of the plurality of arrays is again available;
    executable code that, after the at least one unavailable array is determined as being again available, creates a remote part of the distributed volume at the again available array; and
    executable code that ensures that the distributed volume is in compliance with the distributed storage requirements.

9. The non-transitory computer-readable medium according to claim 8, wherein the distributed storage system includes a redundant array of independent disks (RAID) system.

10. The non-transitory computer-readable medium according to claim 8, wherein performance of the software is transparent to a source of the at least one I/O request.

11. The non-transitory computer-readable medium according to claim 8, wherein the executable code that ensures that the distributed volume is in compliance includes executable code that performs an automatic rebuild of the distributed volume to ensure the remote part of the distributed volume is made consistent with the local part.

12. The non-transitory computer-readable medium according to claim 8, wherein the software further comprises:
    executable code that, after creating the local part, generates a report indicating the distributed volume as being out of compliance with distributed storage requirements.

13. The non-transitory computer-readable medium according to claim 8, wherein a designation of the distributed volume as being out of compliance with the distributed storage requirements that occurs after creation of the local part during the failure is same as a designation of a particular distributed volume being out of compliance resulting from the failure occurring after creation of the particular distributed volume.

14. A non-transitory computer-readable medium storing software for maintaining distributed storage processing of a distributed volume, the software comprising:
    executable code that determines occurrence of a failure causing at least one array of a plurality of arrays of a distributed storage system to become unavailable;
    executable code that identifies at least one available array of the plurality of arrays;
    executable code that creates a local part of the distributed volume and indicates the distributed volume as being out of compliance with distributed storage requirements;
    executable code that exports the local part of the distributed volume to the at least one available array;
    executable code that, in response to at least one I/O request received at the distributed storage system for the distributed volume during the failure, continues the distributed storage processing at the local part of the distributed volume and tracking changes to the local part of the distributed volume;

executable code that determines that the at least one unavailable array of the plurality of arrays is again available;

executable code that, after the at least one unavailable array is determined as being again available, creates a remote part of the distributed volume at the again available array;

executable code that ensures that the distributed volume is in compliance with the distributed storage requirements; and executable code that, after ensuring that the distributed volume is in compliance, generates a report indicating the failure and the steps performed to maintain the distributed storage processing.

15. A distributed storage processing system, comprising:

a plurality of arrays that store data;

at least one controller that manages storage of data on the plurality of arrays; and a non-transitory computer-readable medium storing software, executable by the at least one controller, for maintaining distributed storage processing of a distributed volume during a failure in connection with a plurality of arrays of a distributed storage system, the software comprising:

executable code that determines occurrence of a failure causing at least one array of a plurality of arrays of a distributed storage system to become unavailable;

executable code that identifies at least one available array of the plurality of arrays;

executable code that creates a local part of the distributed volume using data from at least one of the plurality of arrays containing a replica of data on the array that has become unavailable and indicates the distributed volume as being out of compliance with distributed storage requirements;

executable code that exports the local part of the distributed volume to the at least one available array;

executable code that, in response to at least one I/O request received at the distributed storage system for the distributed volume during the failure, continues the distributed storage processing at the local part of the distributed volume and tracking changes to the local part of the distributed volume;

executable code that determines that the at least one unavailable array of the plurality of arrays is again available;

executable code that, after the at least one unavailable array is determined as being again available, creates a remote part of the distributed volume at the again available array; and executable code that ensures that the distributed volume is in compliance with the distributed storage requirements.

16. The distributed storage system according to claim 15, wherein the plurality of arrays includes a redundant array of independent disks (RAID) system.

17. The distributed storage system according to claim 15, wherein performance of the software is transparent to a source of the at least one I/O request.

18. The distributed storage system according to claim 15, wherein the executable code that ensures that the distributed volume is in compliance includes executable code that performs an automatic rebuild of the distributed volume to ensure the remote part of the distributed volume is made consistent with the local part.

19. The distributed storage system according to claim 15, wherein a designation of the distributed volume as being out of compliance with the distributed storage requirements that occurs after creation of the local part during the failure is same as a designation of a particular distributed volume being out of compliance resulting from the failure occurring after creation of the particular distributed volume.

20. A distributed storage system, comprising:

a plurality of arrays that store data;

at least one controller that manages storage of data on the plurality of arrays; and a non-transitory computer-readable medium storing software, executable by the at least one controller, for maintaining distributed storage processing of a distributed volume during a failure in connection with a plurality of arrays of a distributed storage system, the software comprising:

executable code that determines occurrence of a failure causing at least one array of a plurality of arrays of a distributed storage system to become unavailable;

executable code that identifies at least one available array of the plurality of arrays;

executable code that creates a local part of the distributed volume and indicates the distributed volume as being out of compliance with distributed storage requirements;

executable code that exports the local part of the distributed volume to the at least one available array;

executable code that, in response to at least one I/O request received at the distributed storage system for the distributed volume during the failure, continues the distributed storage processing at the local part of the distributed volume and tracking changes to the local part of the distributed volume;

executable code that determines that the at least one unavailable array of the plurality of arrays is again available;

executable code that, after the at least one unavailable array is determined as being again available, creates a remote part of the distributed volume at the again available array;

executable code that ensures that the distributed volume is in compliance with the distributed storage requirements;

executable code that, after creating the local part, generates a report indicating the distributed volume as being out of compliance with distributed storage requirements; and executable code that, after ensuring that the distributed volume is in compliance, generates a report indicating the failure and the steps performed to maintain the distributed storage processing.

* * * * *